R. A. SLOAN.
OBJECTIVE CHANGER OR THE LIKE FOR MICROSCOPES.
APPLICATION FILED NOV. 20, 1918.
1,428,990.
Patented Sept. 12, 1922.
2 SHEETS—SHEET 1.
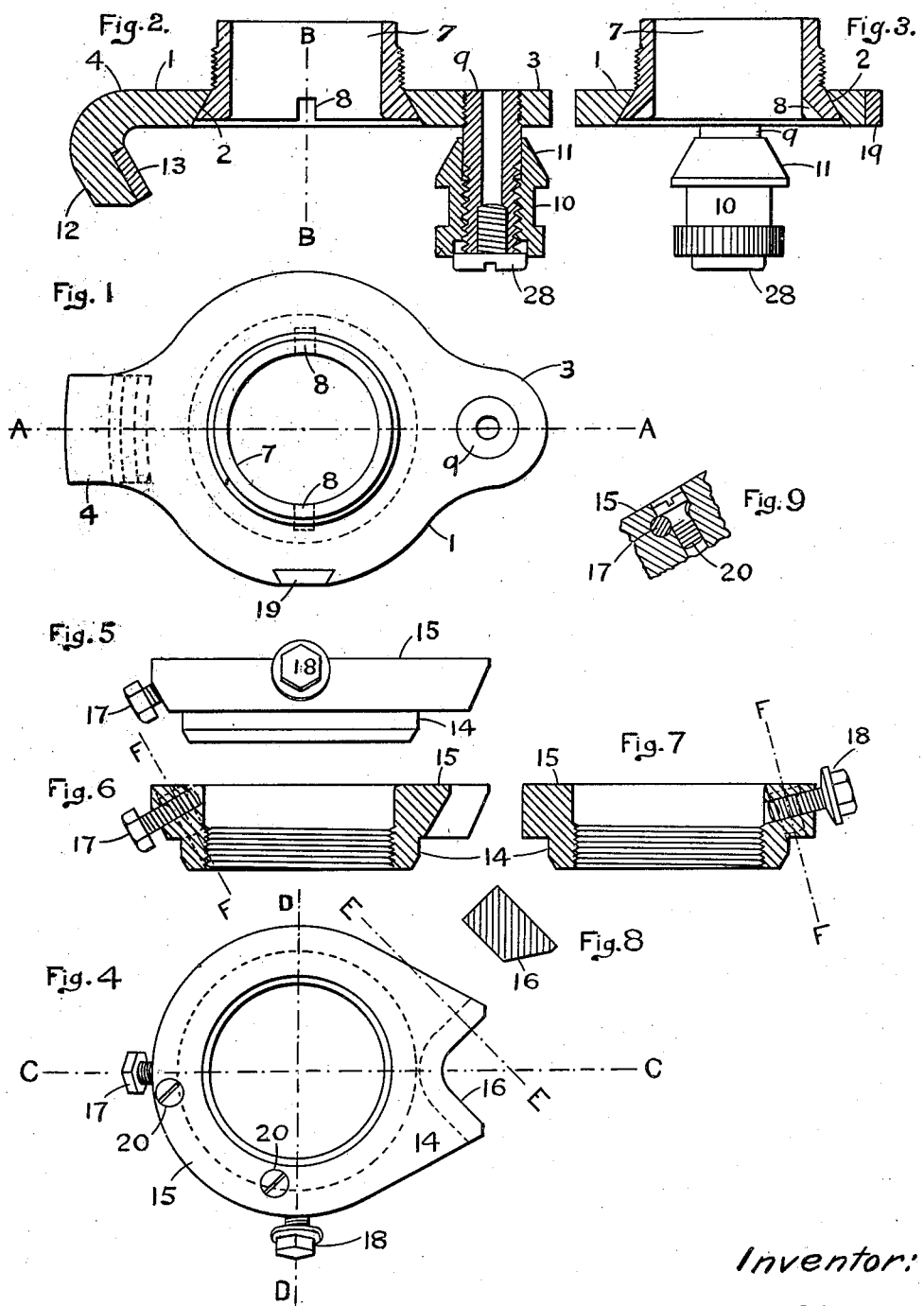
Inventor:
Robert A. Sloan,
by Spear Middleton Donaldson & Spear
Atty's.

R. A. SLOAN.
OBJECTIVE CHANGER OR THE LIKE FOR MICROSCOPES.
APPLICATION FILED NOV. 20, 1918.
1,428,990.
Patented Sept. 12, 1922.
2 SHEETS—SHEET 2.
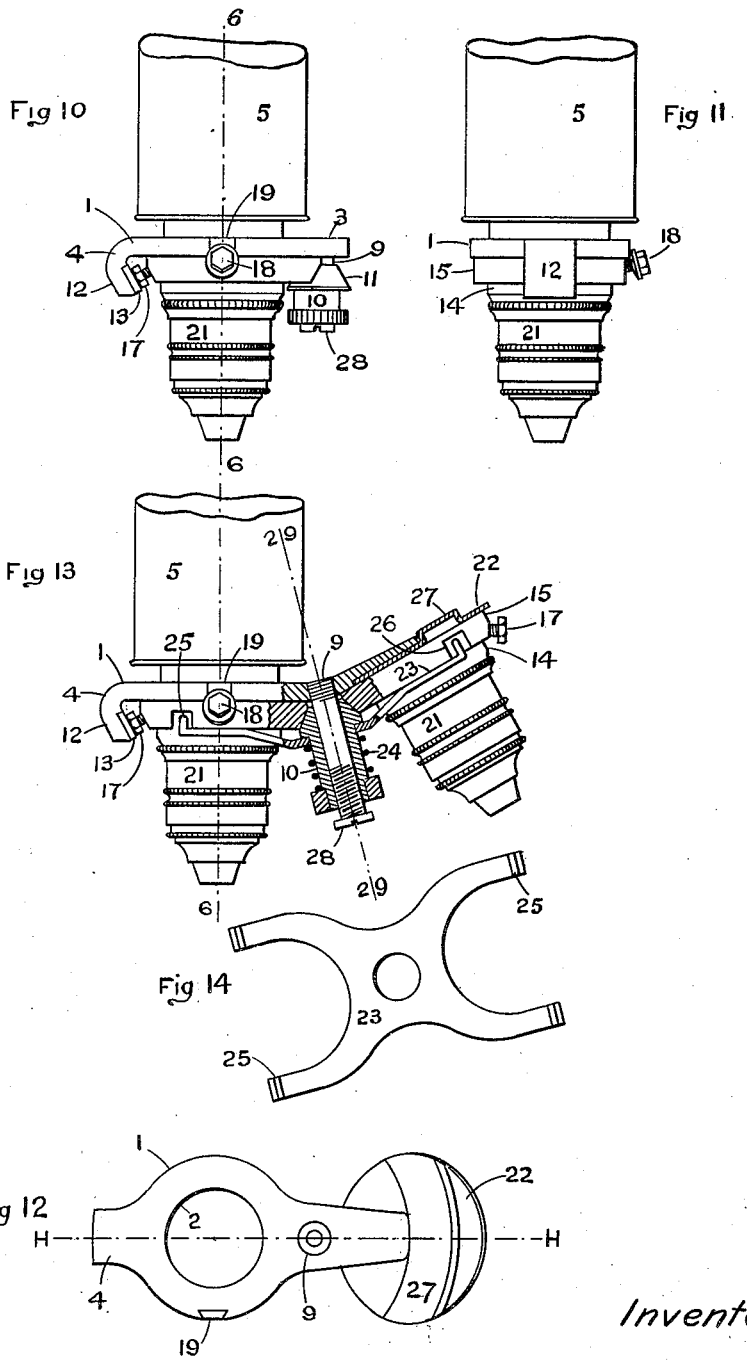
Inventor:
Robert A. Sloan,
by Spear Middleton Donaldson Oferas
Attys.

Patented Sept. 12, 1922.

1,428,990

UNITED STATES PATENT OFFICE.

ROBERT ALEXANDER SLOAN, OF OXTON, ENGLAND.

OBJECTIVE CHANGER OR THE LIKE FOR MICROSCOPES.

Application filed November 20, 1918. Serial No. 263,311.

*To all whom it may concern:*

Be it known that I, ROBERT ALEXANDER SLOAN, a subject of the King of Great Britain, residing in Oxton, Birkenhead, in the county of Chester, England, have invented certain new and useful Improvements in Objective Changers or the like for Microscopes, of which the following is a specification.

The normal method of attaching a microscope objective to the microscope tube is to form the objective mount with a shouldered screwed end which screws into the internally screwed nose of the tube, the shoulder abutting against the latter so as to definitely locate the objective.

Although this forms a secure and positive attachment, it is subject to two objections; in the first place, considerable time and care are required to substitute one objective for another,—an operation which has to be done repeatedly; and in the second place, owing to slight and apparently unavoidable inaccuracies in mounting the lenses, the centres of field of different objectives seldom, if ever, agree precisely, especially in the higher powers, where any error is largely magnified—this being a source of considerable inconvenience and waste of time in the manipulation of the instrument.

These objections—especially the first, have led to the invention of various objective changing devices, such as the revolving nose piece, which is largely used, and the Zeiss sliding objective changer.

The object of my invention is to provide an improved and simplified device of this class, permitting of the attachment and detachment of objectives with great facility, and adapted to hold them securely without possibility of shake, to face them up firmly, and to centre them with precision to any desired point, within limits.

Such a device constructed in accordance with my invention comprises a nose piece adapted to be rigidly secured to the nose of the microscope tube, and a set of adapters, one for each objective, which can be readily attached to and detached from the nose piece.

I have illustrated my invention in the accompanying drawings, in which:—

Figs. 1, 2, and 3 show the nose piece, Fig. 1 being a plan, and Figs. 2 and 3 sectional elevations on the respective lines A, A, and B, B.

Figs. 4 to 9 show an adapter, Figs. 4 and 5 being plan and elevation respectively, and Figs. 6, 7, 8 and 9 being sectional elevations on the respective lines C, C, D, D, E, E, and F, F.

Figs. 10 and 11 are respectively a front and a side elevation to smaller scale, showing the nose piece in position attached to the microscope tube nose, with an adapter (carrying an objective) attached to the nose piece.

Figs. 12 to 14 show the device arranged after the manner of a revolving nose piece, Fig. 12 being a plan of the nose piece, Fig. 13 an elevation, partly in section on the line H, H, and Fig. 14 a plan of the carrier 23.

Referring in the first place to Figs. 1 to 3; 1 is the nose piece, substantially a flat annular plate with a central perforation 2 and the lugs 3 and 4 at opposite ends of the diametral line A, A. The nose piece is fixed concentrically to the nose of the microscope tube 5 and at right angles to the optic axis 6 thereof,—see Figs. 10 and 11. The attachment might be by an ordinary screwed and knurled collar, engaging under an overhung flange, as commonly used in apparatus of this class; but in order to minimize thickness, (which increases the tube length and diminishes clearance above the stage), I prefer to use the arrangement shown. The central perforation 2 is countersunk and is engaged by the conical head of the ferrule 7, screwed to fit the tube nose, and adapted to be firmly screwed into position by the screw-driver slots 8. A convenient form of screw-driver is a short tube adapted to enter freely a short distance into the ferrule and provided with a knurled head and a cross bar the projecting ends of which fit the slots.

It will be seen that the head of the ferrule is housed within the thickness of the nose piece, which is made no greater than is requisite for strength and stiffness.

9 is a screwed stud immovably fixed in the lug 3 and fitted with the knurled nut 10, the upper end 11 of which is conical. The screw is preferably double-threaded so as to reduce the amount of turning required and to mitigate the effect of unnecessary force in screwing up the nut. As the nut 10 only requires to move through a limited range, the stop screw 28 is fitted so as to prevent unnecessary movement or unintentional removal of the nut. The screw 28 has a thread of opposite hand to that of the stud and the tapping hole is carried through so as to lighten the stud and facilitate tapping.

The lug 4 is extended downwardly to form the depending abutment 12 sharply inclined downwardly towards the optic axis, its inner surface 13, which is faced with steel, being part of a conical surface co-axial with the stud 9 or approximately so.

Referring now to Figs. 4 to 9; each adapter consists of a short barrel 14 screwed internally to take the objective thread and flanged above at 15 to abut against the lower face of the nose piece.

At one end of the diametral line C, C, there is an extension 16 in the form of a forked lug adapted to engage above the conical nut 10, between it and the lower face of the nose piece; as shown in Fig. 4 the jaws of the forked lug form an open-ended V co-axial with the line C, C, and the sides of the V are bevelled as shown in Fig. 8 to conform with the end of the conical nut 10, and it will be seen by reference to Fig. 10, that when the adapter is put in place and the nut then screwed up, the effect is to press that end of the adapter close up against the face of the nose piece and also to press the adapter radially away from the stud.

At the other end of the line C, C, a set screw 17, which may be termed the end screw, is screwed into the side of the flange; this screw is inclined downwardly and its head, (see Fig. 10), is adapted to abut normally against the steel face 13 of the abutment 12.

A second set screw 18 with a collared head, which may be termed the side screw, is screwed into the side of the flange on a radial line at right angles to the line C, C, the edge of the collar projecting above the top face of the flange and being adapted to abut and form a stop against the edge of the nose piece, which is locally faced with a steel strip 19. For constructional reasons, the axis of the screw 18 is inclined as shown in Fig. 7. This permits the screw to start very close to the top of the flange and yet leaves sufficient thickness of metal to house it properly; the collar is coned as shown so that the abutting surface conforms with the square edge of the nose piece against which it abuts.

Any of the usual methods may be used for locking the screws 17 and 18, but the method shown in Fig. 9 has been found to answer well. 20 is a screw arranged at right angles to the screw it is intended to lock, with its head over-lapping the latter, and when screwed down it forms an effective lock. The heads of these locking screws are of course kept below the flange face.

As stated, each objective 21 is provided with its own adapter into which it is permanently screwed.

The nut 10 being relaxed, the fork of the adapter (with its attached objective) is slipped between the nut and the nose piece, and the adapter while gently pressed up flat against the nose piece, is swung round the nut until arrested by the side screw, when the nut is screwed up with moderate force until the end screw abuts firmly against the face 13 of the abutment 12. The oblique re-action of the latter presses that end of the adapter against the nose piece, so that it is clamped against the nose piece at opposite ends of the diametral line A, A, and is firmly faced up.

It is obvious that by adjusting the end and side screws, the centre of the field of the objective can be adjusted with precision to any desired point, within limits, and this adjustment, once made and the screws locked, is permanent, so that all the objectives of a set can be centred with each other, thus eliminating the effects of inaccuracies in the lens mounts.

By the use of an objective changer as described the objectives can be attached or detached with the greatest facility,—almost instantaneously; they are securely clamped without any liability to shake,—as for instance when manipulating a correction collar; they are firmly faced up, and centred with precision. The device may be cheaply constructed almost entirely by lathe work, is of simple form not likely to be deranged, is almost free from wear, as the adapters are moved quite freely until properly located, and the result of any wear can be readily eliminated by a slight re-adjustment of the screws. The device is light and compact, so that it can be used on closely built instruments.

While described as an objective changer, this being its main purpose, the device can obviously be used with advantage as a centring nose piece even for a single objective, where it is desired to centre the latter with a rotating stage unprovided with centring screws.

The device may also be applied for the attachment of a sub-stage condenser to a sub-stage, the advantage of the ready removal of the condenser and its replacement with precision in permanent concentric adjustment with all the set of objectives, being obvious.

It is clear that mechanical equivalents might be substituted for the form of fastening constituted by the coned nut 10 and the V jaw 16; the characteristic features of this fastening are that it presses one end of the adapter against the face of the nose piece, and locates it positively across the face of the nose piece in one direction, and presses it away from the fastening along the face of the nose piece in a direction at right angles to the first.

The device can be readily arranged after the manner of a revolving nose piece, as shown in Figs. 12 to 14 which illustrate a double nose piece.

The nose piece 1 which is substantially as already described is provided with a light extension 22, the under surface of which is part of a shallow cone with its axis 29 inclined as usual to the optic axis 6. The screwed stud 9 is co-axial with the conical surface, and the adapters are arranged symmetrically round it, being hung loosely in the carrier 23 which is revolubly ferruled round the barrel of the nut 10 and pressed upwardly by the spring 24. The carrier has upwardly turned nibs 25 which engage freely in recesses 26 formed in the adapter flange.

The spring 24 permits the carrier 23 to be depressed sufficiently to allow the adapters to be inserted or removed, and it also allows the objective to be lowered sufficiently to permit the side screw 18 to clear the abutment 19 in changing objectives. The extension 22 is trenched at 27 so as to clear the side screw 18 and permit the adapters to swing close up below the extension 22.

The constructive details may obviously be modified, as for instance, by trenching the nose piece 1, as well as the extension 22 and pivoting the abutment 19 so that it can be raised slightly to clear the side screw so that the objectives can be changed without lowering them. The device can of course be arranged for three or more objectives; in that case, the conical surface 22 is preferably carried round to meet the edges of the nose piece 1, and the adapters may if preferred be retained by a shallow depending rim in place of the nibs 25.

Although the arrangement presents a general resemblance to an ordinary revolving piece, it differs essentially from it, inasmuch as the objective in use is positively clamped in position; it should be noted that the nose piece 1 to which the objective in use is clamped does not partake of the general conical form, being flat as previously described, as any rotation of the adaptor in a conical locus would throw its axis out of parallelism with the optic axis. The device further differs from all revolving nose pieces with which I am acquainted, in having means for centring the objectives.

The revolving arrangement has the advantage that the objectives do not require to be laid down and picked up in changing, as they are always held ready to be swung into position.

On the other hand it loads the instrument detrimentally and does not give the same facility as the simpler form if the number of objectives in use is greater than can be held simultaneously in the revolving arrangement.

Having now fully described my invention, I declare that what I claim, and desire to secure by Letters Patent, is:—

1. The improved device for attaching microscope objectives or the like, comprising a nose piece adapted to be rigidly secured to the microscope nose and having an undercut inclined abutment at one end and a fastening device at the other end, and an adaptor for the objective adapted to be pressed by the said fastening against the nose piece and towards the abutment so as to engage therewith, with means for limiting the movements of the adaptor; substantially as set forth.

2. In an arrangement as characterized in claim 1, means for limiting the movements of the adaptor, consisting of an adjustable screw adapted to engage against the abutment, and a second adjustable screw arranged at right angles to the first, or approximately so, and adapted to engage against the nose piece, so that the objective can be accurately centred; substantially as described.

3. In an arrangement as characterized in claim 1, means for securing the adaptor to the nose piece, consisting of a coned nut or screw mounted on the nose piece, and a V fork with bevelled edges on the adaptor adapted to engage between the coned nut and the face of the nose piece; substantially as described.

4. In combination with an arrangement as characterized in claim 1, means for carrying two or more objectives so that any one may be brought into use, consisting of a rotatable spring-controlled carrier for loosely holding the several adapters, with a conical extension of the nose piece to form a cover for the objectives not in use; substantially as described.

In witness whereof I set my hand in presence of witnesses.

ROBERT ALEXANDER SLOAN.

Witnesses:
J. E. LLOYD BARNES,
JOSEPH E. HIRST.